(12) United States Patent
Sudo et al.

(10) Patent No.: US 12,482,459 B2
(45) Date of Patent: Nov. 25, 2025

(54) SPEECH RECOGNITION SYSTEM, ACOUSTIC PROCESSING METHOD, AND NON-TEMPORARY COMPUTER-READABLE MEDIUM

(71) Applicant: HONDA MOTOR CO., LTD., Tokyo (JP)

(72) Inventors: Yui Sudo, Wako (JP); Kazuhiro Nakadai, Wako (JP); Muhammad Shakeel, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 250 days.

(21) Appl. No.: 17/897,352

(22) Filed: Aug. 29, 2022

(65) Prior Publication Data

US 2024/0071379 A1 Feb. 29, 2024

(51) Int. Cl.
| | | |
|---|---|---|
| G10L 15/02 | (2006.01) | |
| G10L 15/04 | (2013.01) | |
| G10L 15/16 | (2006.01) | |
| G10L 15/197 | (2013.01) | |
| G10L 25/78 | (2013.01) | |

(52) U.S. Cl.
CPC .......... *G10L 15/197* (2013.01); *G10L 15/02* (2013.01); *G10L 15/04* (2013.01)

(58) Field of Classification Search
None
See application file for complete search history.

(56) References Cited

U.S. PATENT DOCUMENTS

| | | | | |
|---|---|---|---|---|
| 5,613,037 A | * | 3/1997 | Sukkar | G10L 15/142 |
| | | | | 704/251 |
| 6,629,070 B1 | * | 9/2003 | Nagasaki | G10L 25/78 |
| | | | | 704/E11.003 |
| 2022/0230627 A1 | * | 7/2022 | Chang | G10L 15/187 |

FOREIGN PATENT DOCUMENTS

WO 2018/207390 11/2018

OTHER PUBLICATIONS

Suyoun Kim, Takaaki Hori, and Shinji Watanabe, "Joint CTC-Attention Based End-To-End Speech Recognition Using Multi-Task Learning", 2017 IEEE International Conference on Acoustics, Speech and Signal Processing (ICASSP), Mar. 5-9, 2017, DOI: 10.1109/ICASSP.2017.7953075.

* cited by examiner

*Primary Examiner* — Pierre Louis Desir
*Assistant Examiner* — Kristen Michelle Masters
(74) *Attorney, Agent, or Firm* — Amin, Turocy & Watson, LLP

(57) ABSTRACT

The speech recognition that is disclosed analyzes an acoustic feature for each subframe of an audio signal; provides a first model configured to determine a hidden state for each frame consisting of multiple subframes on the basis of the acoustic feature; provides a second model configured to determine a hidden state for each frame consisting of multiple subframes on the basis of the acoustic feature; and provides a third model configured to determine an utterance content on the basis of a sequence of the hidden states of each block consisting of multiple frames belonging to a voice segment.

7 Claims, 7 Drawing Sheets

FIG. 8

| MODEL | NO. OF PARAMETERS | AMI | CSJ | TED-LIUMv2 |
|---|---|---|---|---|
| EXTERNAL VAD | 4.45 M | 5.7 | 4.7 | 7.1 |
| CTC-BASED | 0 | 9.3 | 19.2 | 5.7 |
| PRESENT EMBODIMENT | 0.8 K | 6.9 | 5.7 | 5.5 |

FIG. 9

| CORPUS (SPEECH SECTION) | eval1 (80%) | eval2 (81%) | eval3 (77%) |
|---|---|---|---|
| ORACLE | 5.9 | 4.2 | 4.6 |
| BASELINE ($L_{th}=0$) | 15.1 | 12.9 | 14.1 |
| BASELINE ($L_{th}=300$) | 10.1 | 7.4 | 7.9 |
| BASELINE ($L_{th}=500$) | 27.1 | 22.8 | 23.0 |
| CTC-BASED | 18.9 (AVERAGE) | | |
| PRESENT EMBODIMENT | 9.1 | 6.7 | 7.7 |

FIG. 10

| METHOD | eval1 | eval2 | eval3 |
|---|---|---|---|
| BASELINE ($L_{th}=300$) | 10.1 | 7.4 | 7.9 |
| PRESENT EMBODIMENT (W/O RE-BLOCKING) | 10.4 | 7.7 | 11.7 |
| PRESENT EMBODIMENT (W/ RE-BLOCKING) | 9.1 | 6.7 | 7.7 |

FIG. 11

| THRESHOLD | eval1 | eval2 | eval3 | RTF |
|---|---|---|---|---|
| BASELINE ($L_{th}=300$) | 10.1 | 7.4 | 7.9 | 0.55 |
| PRESENT EMBODIMENT (V=5) | 9.4 | 7.1 | 8.3 | 0.35 |
| PRESENT EMBODIMENT (V=10) | 9.1 | 6.7 | 7.7 | 0.40 |
| PRESENT EMBODIMENT (V=16) | 9.4 | 7.2 | 7.7 | 0.40 |

SPEECH RECOGNITION SYSTEM, ACOUSTIC PROCESSING METHOD, AND NON-TEMPORARY COMPUTER-READABLE MEDIUM

BACKGROUND OF THE INVENTION

Field of the Invention

The present invention relates to a speech recognition system, an acoustic processing method, and a non-temporary computer-readable medium

Description of Related Art

Speech recognition technology has become widespread in various situations. For example, it is applied to voice input to information devices such as personal computers (PCs) and mobile phones, as well as home appliances such as refrigerators and air conditioners. Streaming speech recognition may be used in these devices. Streaming speech recognition is a method of determining the content of utterances by performing speech recognition processing for each voice segment. In the streaming speech recognition process, voice activity detection (VAD) is introduced as a pre-process. Since the utterance content for each voice segment is obtained before the input of the entire uttered sentence is completed, the responsiveness is improved. As a speech recognition process, techniques are used such as connectionist temporal classification-based end-to-end automatic speech recognition (CTC-based E2E ASR, refer to Patent Document 1 and Non-Patent Document 1).

Various methods have been proposed for VAD, including energy-based methods and methods using statistical models and deep learning models. Energy-based methods include, for example, the zero-cross method, while statistical models are those such as the hidden Markov model (HMM) and Gaussian mixture model (GMM). Deep learning models include, for example, multi-layer perceptrons (MLPs), long short-term memory (LSTM), convolutional neural networks (CNNs), and transformers.

CITATION LIST

Patent Documents

Patent Document 1: PCT International Publication No. 2018/207390

Non-Patent Documents

Non-Patent Document 1: Suyoun Kim, Takaaki Hori, and Shinji Watanabe, "Joint CTC-Attention based End-to-End Speech Recognition using Multi-task Learning", 2017 IEEE International Conference on Acoustics, Speech and Signal Processing, 5-9 Mar. 2017, DOI: 10.1109/ICASSP.2017.7953075

SUMMARY OF THE INVENTION

The aforementioned zero-cross method is a method with relatively low computation. However, a section where the noise volume is relatively loud may be erroneously recognized as a voice segment. Methods using a statistical model or a deep learning model require many parameters and tend to be computationally intensive. Further, in each method, errors due to each process accumulate by simply following the speech recognition process to the VAD. As a result, a decrease in the speech recognition rate may become apparent.

The present specification discloses a system and method for speech recognition. The system and method may be used in combination or separately.

(1) One aspect of the present embodiment is a speech recognition system that is provided with a processor and a memory, in which the memory is configured to store instructions for speech recognition, the instructions: having commands for analyzing an acoustic feature for each subframe of an audio signal, having a first model configured to determine a hidden state for each frame consisting of multiple subframes on the basis of the acoustic feature, having a second model configured to determine a voice segment for each frame on the basis of the hidden state, and having a third model configured to determine an utterance content on the basis of a sequence of the hidden states of each block consisting of multiple frames belonging to a voice segment.

(2) One aspect of the present embodiment is the acoustic processing system of (1), in which the second model may be configured to divide a block comprising two or more voice segments consisting of voice segment frames that are frames belonging to a voice segment into blocks that individually contain voice segments.

(3) One aspect of the present embodiment is the acoustic processing system of (2) in which the second model may be configured to calculate for each frame a probability that the frame belongs to a voice segment on the basis of the hidden state as a voice segment probability; determine among inactive frames, which are frames whose voice segment probability is equal to or less than a predetermined probability threshold, segments in which inactive frames are consecutive beyond a predetermined threshold frame number to be non-voice segments, determine other segments to be voice segments, and determine frames whose voice segment probability is greater than the probability threshold and segments in which the inactive frames are not consecutive beyond the threshold frame number to be voice segments.

(4) One aspect of the present embodiment is the acoustic processing system of (1) in which the first model may comprise a first-stage model and a second-stage model, the first-stage model being configured to convert an acoustic feature for each subframe to a frame feature for each frame, and the second-stage model being configured to estimate the hidden state on the basis of the frame feature.

(5) One aspect of the present embodiment is the acoustic processing system of (1) in which the third model may be configured to calculate an estimated probability for each candidate of the utterance content corresponding to a sequence of the hidden states up to the latest block forming a voice segment, and determine the utterance content with the highest estimated probability.

(6) One aspect of the present embodiment is a non-temporary computer-readable medium storing instructions for a speech recognition system, the the instructions: having commands for analyzing an acoustic feature for each subframe of an audio signal; having a first model configured to determine a hidden state for each frame consisting of multiple subframes on the basis of the acoustic feature; a second model configured to determine a voice segment for each frame on the basis of the hidden state; and a third model configured to determine an utterance content on the basis of a sequence of the hidden states of each block consisting of multiple frames belonging to a voice segment.

(7) One aspect of the present embodiment is a method for speech recognition that may analyze an acoustic feature for each subframe of an audio signal; provide a first model configured to determine a hidden state for each frame consisting of multiple subframes on the basis of the acoustic feature; provide a second model configured to determine a voice segment for each frame on the basis of the hidden state; and provide a third model configured to determine an utterance content on the basis of a sequence of the hidden states of each block consisting of multiple frames belonging to a voice segment.

Further areas of applicability of the present disclosure will become apparent from the detailed description, claims, and drawings. The detailed description and specific examples are for illustrative purposes only and are not intended to limit the scope of the present disclosure.

BRIEF DESCRIPTION OF THE DRAWINGS

This disclosure will be better understood from the detailed description and the accompanying drawings below.

FIG. 8 is a table illustrating the detection error rate for each model.

FIG. 9 is a table illustrating index values for each method.

FIG. 10 is a table illustrating the difference in index values depending on the presence or absence of re-blocking.

FIG. 11 is a table illustrating index values for each consecutive non-voice duration threshold.

DETAILED DESCRIPTION OF THE INVENTION

Figure 1:
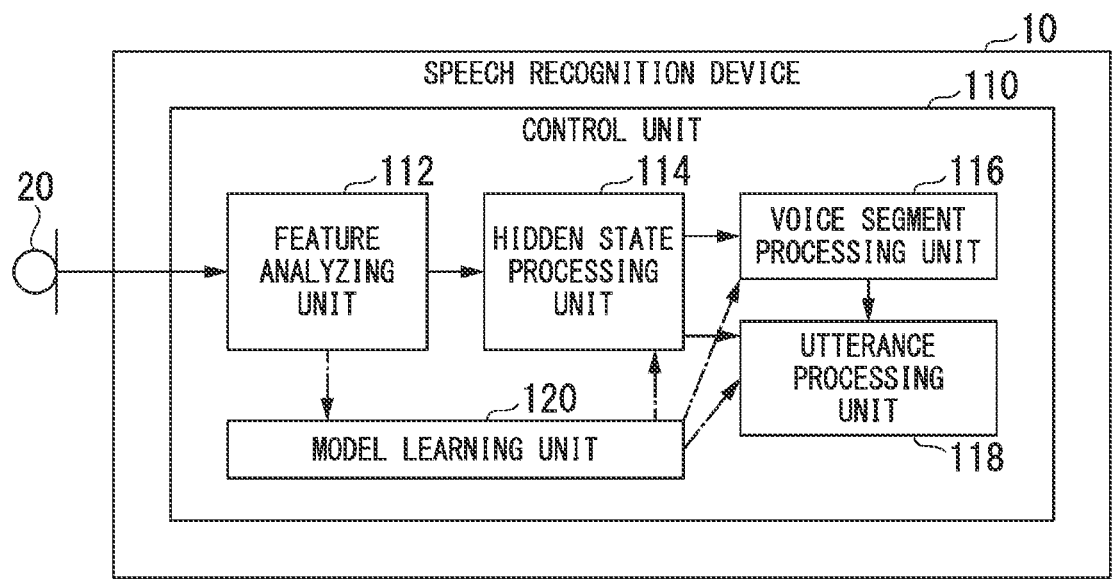
FIG. 1 is a schematic block diagram showing a function configuration example of the speech recognition device according to the present embodiment.

Hereinbelow, an embodiment of the present disclosure will be described with reference to the drawings. First, a functional configuration example of a speech recognition device 10 according to the present embodiment will be described (FIG. 1). The speech recognition device 10 analyzes an acoustic feature for each subframe having a predetermined length with respect to an audio signal input from a microphone 20. The speech recognition device 10 uses a first model to determine a hidden state for each frame composed of a plurality of subframes based on the acoustic feature analyzed for each subframe. The speech recognition device 10 uses a second model to determine a voice segment in which an utterance is made based on the hidden state determined for each frame. The speech recognition device 10 determines the utterance content based on a sequence of hidden states formed for each block composed of a plurality of frames belonging to the voice segment. The speech recognition device 10 is applied to various processes based on the determined utterance content. The various processes include, for example, voice command identification, execution of a process instructed by the identified voice command, document creation, editing, and the like.

The speech recognition device 10 is provided with a control unit 110. The control unit 110 is provided with a feature analysis unit 112, a hidden state processing unit 114, a voice segment processing unit 116, an utterance processing unit 118, and a model training unit 120. The speech recognition device 10 illustrated in FIG. 1 executes attention-based transformer speech recognition processes.

The feature analysis unit 112 acquires an audio signal input from the microphone 20. The audio signal is a digital signal representing a time series of signal values sampled at a predetermined sampling frequency, which is, for example, 16 kHz. The feature analysis unit 112 calculates an acoustic feature for each analysis window having a predetermined window size. The analysis window is a segment to be analyzed at a time for the acoustic characteristics of the audio signal, and corresponds to a subframe in the first model (described below). The window size corresponds to the period to be analyzed. The window size is, for example, 512 samples. The feature analysis unit 112 moves the segment of the analysis window by a predetermined hop length at a regular time interval. The hop length corresponds to the period during which the analysis window is moved at a time. The hop length may be a positive real number equal to or less than the window size. The hop length is, for example, 128 samples. The feature analysis unit 112 calculates a feature representing a frequency characteristic such as a mel-spectrum as the acoustic feature. The feature analysis unit 112 outputs the acoustic feature calculated for each subframe to the hidden state processing unit 114.

The acoustic feature for each subframe is input from the feature analysis unit 112 to the hidden state processing unit 114. The hidden state processing unit 114 calculates a hidden state for each frame from the acoustic feature of each subframe using the first model. A frame is a processing unit larger than a subframe. In the examples of FIGS. 3 to 6, one frame corresponds to two subframes. One frame may also be three or more subframes. The first model is a mathematical model corresponding to an encoder.

The first model has a multi-stage mathematical model, with individual mathematical models being connected in series. The first model includes, for example, a first-stage model and a second-stage model. The first stage model has a multi-layer convolutional layer, a linear projection layer, and a positional encoding layer, which are connected in series. The number of layers of the convolutional layer is, for example, two layers. The stride in each convolutional layer is respectively 2 and 3. The number of dimensions of the linear projection layer is, for example, 512 dimensions.

As illustrated in Equation (1), the hidden state processing unit 114 uses $X=[x_1, x_2, \ldots, x_T]$, which is the acoustic processing of T sub-frames up to that point, as an input value, and outputs an L-frame frame feature sequence $u=[u_1, u_2, \ldots, u_L]$ as the output value using the first stage model. In Equation (1), ConvSubsamp ( . . . ) represents an operation using the first model for . . . , that is, subsampling by the convolutional layers. L and T are positive integers, respectively, with L being larger than T. The frame feature is the subsampled output value with respect to the input value. Subsampling is also called downsampling.

[Equation 1]

$$u = \text{ConvSubsamp}(X) \quad (1)$$

The second stage model is provided with transformer blocks. The first stage model has, for example, two or more convolutional layers, which are connected in series. The second stage model includes multiple layers of transformer blocks, which are connected in series. The number of layers of the transformer block is, for example, 12 layers. Each transformer block has a multi-headed self-attention layer, a linear layer, and a layer-normalization layer, with residual connections. The number of layer normalization layers is, for example, 2048.

As illustrated in Equation (2), the hidden state processing unit 114, using the model of the second stage, takes the L-frame frame feature sequence u up to the latest frame at that point as an input value to calculate L-length hidden states h up to the latest frame as the output value. In Equation (2), TrEncoder ( . . . ) represents an operation using the second model, that is, encoding using the transformer blocks. The frame feature sequence is configured to include the frame feature of each frame. The hidden state sequence is configured to include the hidden state for each frame. The hidden state processing unit 114 outputs the calculated hidden state of the latest frame to the voice segment processing unit 116.

[Equation 2]

$$h = \text{TrEncoder}(u) \quad (2)$$

As illustrated in Equation (3), the hidden state processing unit 114 constitutes a sequence of frame features u [$u_{(b-1)Lhop+1}, \ldots, u_{(b-1)Lhop+Lblock}$] for each frame up to block b−1 immediately before the latest block b as frame feature sequence $u_b$ of block b. $L_{block}$ and $L_{hop}$ indicate the block length and hop length, respectively. The block length $L_{block}$ corresponds to the number of frames per block. The block length $L_{block}$ may be equal to L as its reference value. The hop length $L_{hop}$ indicates the number of frames corresponding to the block interval to be processed. $L_{block}$ and $L_{hop}$ are, for example, 40 and 16, respectively. The hidden state processing unit 114, using the configured frame feature sequence up as an input value, outputs the hidden state $h_b$ calculated using the second stage model as an output value to the utterance processing unit 118. The hidden state is basically shared by the voice segment processing unit 116 and the utterance processing unit 118. Therefore, the hidden state processing unit 114 or the first model can be regarded as a shared encoder.

[Equation 3]

$$h_p = \text{BlockTrEncoder}(u_b) \quad (3)$$

The hidden state for each frame from the hidden state processing unit 114 is input to the voice segment processing unit 116. The voice segment processing unit 116 uses the second model to detect a voice segment based on the hidden state for each frame. The second model has a mathematical model for calculating the voice segment probability from the hidden state for each frame. The voice segment probability corresponds to the probability that a sound in that period is a human voice, that is, the probability of the presence of a voice segment. In other words, a voice segment can also be regarded as an utterance segment in which a person speaks.

The second model corresponds to the Voice Activity Detection (VAD) branch. The second model has, for example, a machine learning model and a normalization function, which are connected in that order. The machine learning model may be a relatively simple mathematical model such as a one-layer or two-layer fully connected (FC) layer, or may be a more complicated mathematical model. The second model may also be a deep neural network (DNN) having two or more layers. The normalization function may be, for example, any of a Sigmoid function, a hyperbolic tangent function, and the like.

With the hidden state as an input value, the voice segment processing unit 116 uses the second model to calculate the voice segment probability as an output value. By using the normalization function, a normalized real value can be obtained within the range of the range of 0 or more and 1 or less as the output value.

The voice segment processing unit 116 determines a frame whose voice segment probability exceeds a predetermined probability threshold to be an active frame, and determines a frame whose voice segment probability is equal to or less than the probability threshold to be an inactive frame. In a series of frame sequences consisting of multiple frames, the voice segment processing unit 116 considers segments consisting of inactive frames whose frame number is consecutive beyond a predetermined consecutive non-voice duration threshold V to be non-voice segments. The voice segment processing unit 116 considers other segments, that is, segments that do not include inactive frames whose frame number is not consecutive beyond the consecutive non-voice duration threshold, to be voice segments. A voice segment includes active frames in which the speech probability exceeds the probability threshold and inactive frames whose number is not consecutive beyond the consecutive non-voice duration threshold.

The voice segment processing unit 116 outputs voice segment information indicating whether or not, for each block composed of a plurality of frames, the block includes a voice segment, to the utterance processing unit 118.

To the utterance processing unit 118 are input the hidden state feature from the hidden state processing unit 114 for each block, and the voice segment information from the voice segment processing unit 116.

The utterance processing unit 118 uses a third model to determine utterance content based on the hidden state sequence for each block belonging to the voice segment. The third model corresponds to the ASR decoder. The third model is, for example, an attention decoder. The utterance processing unit 118 refers to the voice segment information that is input to specify blocks including voice segments. The utterance processing unit 118 integrates the hidden state sequence for each block including a voice segment up to the latest block b, and constitutes an integrated hidden state sequence $h_{1:b}$.

As illustrated in Equation (4), the utterance processing unit 118 uses the configured hidden state sequence $h_{1:b}$ as an input value, and, using the third model, calculates for each utterance information candidate (hypothetical) y, an estimated probability p(y|h1:b) indicating the possibility that the candidate y has been uttered. The utterance processing unit 118 can determine a candidate for utterance information that gives the highest estimated probability among the estimated probabilities that have been calculated as a recognition result y' indicating the utterance content for that block sequence. In Equation (4), argmax $_{y \in V^*}$ ( . . . ) represents y in which . . . of the set V* is the maximum. V* indicates a set of possible utterance information candidates for the hidden state sequence $h_{1:b}$. The utterance information or its candidate is configured using of a label sequence containing one or more labels. A label can be a letter, a syllable, a word, or any other unit related to the notation of the utterance content. A label sequence may be represented using text.

The utterance processing unit 118 can use, for example, a known beam search technique when searching for the recognition result y' from a set of utterance information candidates.

[Equation 4]

$$y' = \arg\max_{y \in V^*} (\log (p(y|h_{1:b}))) \quad (4)$$

The control unit 110 may store the utterance information, which is the recognition result determined by the utterance processing unit 118, may use the utterance information for other processing, or may output the utterance information to another device.

The model trains unit 120 trains the first model, the second model, and the third model using training data configured in advance. In the present disclosure, "model training" or "training a model" means defining a parameter set used in an operation based on the model. In the present disclosure, model training in two stages is performed. In the model training of the first stage, the first model and the third model are targeted for training. In the model training of the second stage, the second model is targeted for training. In general, training data includes a plurality of different datasets, and each dataset contains input data and output data, which are associated with each other. In the present disclosure, the training data of the first type and the second type are used in the model training of the first stage and the second stage, respectively.

Each data set included in the training data of the first type includes an audio signal in a certain voice segment as input data, and includes utterance information indicating known utterance content in that voice segment as output data. This output data can be represented by a vector value in which the probability for the candidate of the utterance information giving the correct answer is 1, and the probability for other utterance information is 0.

When executing the model training of the first stage, the model training unit 120 outputs the input data to the feature analysis unit 112 for each data set forming the first type of training data. From the utterance processing unit 118, an estimated probability is obtained for each candidate of utterance information based on the input data. The model training unit 120 recurrently updates the parameter set of the first model (hereinbelow referred to as "first model parameter set") and the parameter set of the third model (hereinbelow referred to as "third model parameter set") so that a first difference between the estimated probability obtained for each candidate of utterance information and the estimated probability shown in the output data is reduced for the training data as a whole. When the first difference is equal to or less than a predetermined first convergence determination threshold, the model training unit 120 determines that the first difference has converged. At that time, the model training unit 120 stops the model training of the first stage, and sets the obtained first model parameter set and the third model parameter set in the hidden state processing unit 114 and the utterance processing unit 118, respectively.

Note that, for example, binary cross entropy can be used as a loss function indicating the magnitude of the difference. In the learning of the first model parameter set and the third model parameter set, for example, backpropagation based on the steepest gradient method or the stochastic gradient descent method, or a modification thereof (for example, Adam optimizer) can be used.

Each dataset included in the second type of training data contains as input data an audio signal including both voice segments and non-voice segments, and contains as output data known voice segment information indicating whether or not each frame is a voice segment. This output data can be represented by a vector value in which the voice segment probability per frame for a voice segment is 1, and the voice segment probability per frame for a non-voice segment is 0.

The model training unit 120 executes the model training of the second stage in a state where the first model parameter set obtained by the first stage model training is set in the hidden state processing unit 114.

The model training unit 120 outputs input data to the feature analysis unit 112 for each data set that forms the second type of training data. The model training unit 120 recurrently updates the parameter set of the second model (hereinbelow referred to as "second model parameter set") so that a second difference between the voice segment probability for each frame obtained from the voice segment processing unit 116 based on the input data and the voice segment probability in the frame indicated in the output data is reduced. When the second difference is equal to or less than a predetermined second convergence determination threshold, the model training unit 120 determines that the second difference has converged. The model training unit 120 at that time stops the model training of the second stage, and sets the obtained second model parameter set in the voice segment processing unit 116.

Figure 2:
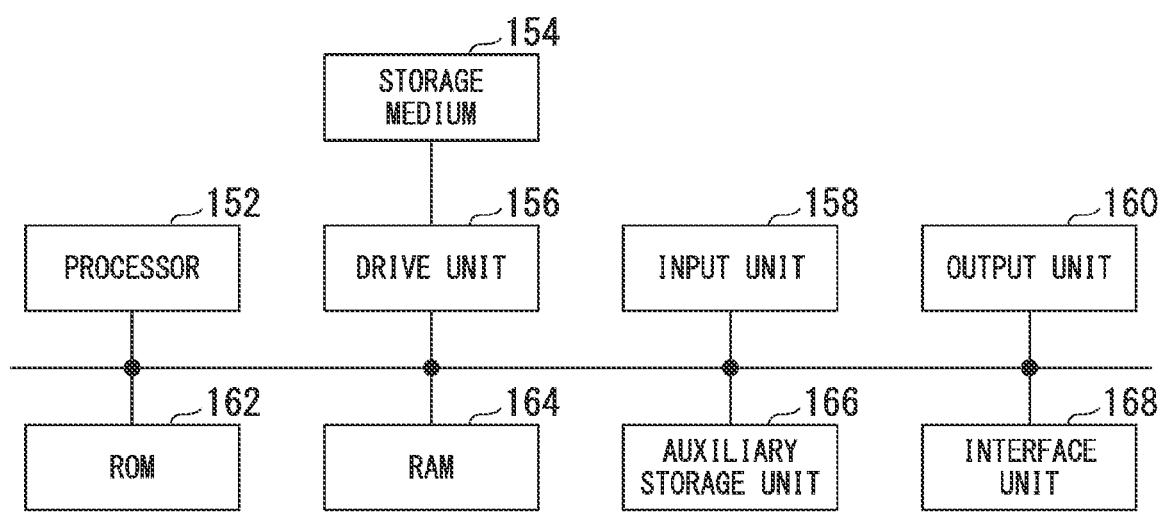
FIG. 2 is a schematic block diagram showing a hardware configuration example of the speech recognition device according to the present embodiment.

Next, the hardware configuration example of the speech recognition device 10 according to the present embodiment will be described. FIG. 2 is a schematic block diagram showing a hardware configuration example of the speech recognition device 10 according to the present embodiment. The speech recognition device 10 may be configured as a speech recognition system including a dedicated member (for example, an integrated circuit) forming a set of one or a plurality of the functional units exemplified in FIG. 1. The speech recognition device 10 may be configured as a part or all of a general-purpose computer system as a speech recognition system.

The speech recognition device 10 is provided with, for example, a processor 152, a drive unit 156, an input unit 158, an output unit 160, a ROM (Read Only Memory) 162, a RAM (Random Access Memory) 164, an auxiliary storage unit 166, and an interface unit 168. The processor 152, the drive unit 156, the input unit 158, the output unit 160, the ROM 162, the RAM 164, the auxiliary storage unit 166, and the interface unit 168 are connected to each other by using a bus BS.

The processor 152 reads, for example, a program and various pieces of data stored in the ROM 162 and executes the program to control the operation of the speech recognition device 10. The processor 152 includes, for example, one or a plurality of CPUs (Central Processing Units). In the present disclosure, "execution of the program" includes the meaning of executing a process instructed by various commands written in the program.

The processor 152 executes a predetermined program to realize all or some of the functions of the control unit 110, for example, some or all of the functions of the feature analysis unit 112, the hidden state processing unit 114, the voice segment processing unit 116, the utterance processing unit 118, and the model training unit 120 of the control unit 110.

A storage medium 154 stores various types of data. The storage medium 154 is a portable storage medium such as a magneto-optical disk, a flexible disk, or a flash memory.

The drive unit 156 is, for example, a device that reads various data from the storage medium 154 and writes various data to the storage medium 154, or both.

The input unit 158 receives input data from various devices serving as input sources, and outputs the input data to the processor 152.

The output unit 160 outputs the output data input from the processor 152 to various devices that are output destinations.

The ROM 162 stores, for example, a program for execution by the processor 152.

The RAM 164 is used, for example, as a main storage medium that functions as a work area for temporarily storing various data and programs used in the processor 152.

The auxiliary storage unit 166 is a storage medium such as an HDD (Hard Disk Drive) or a flash memory.

The interface unit 168 is connected to other devices to enable input and output of various data. The interface unit 168 includes, for example, a communication module that connects to a network by wire or wirelessly.

Figure 3:
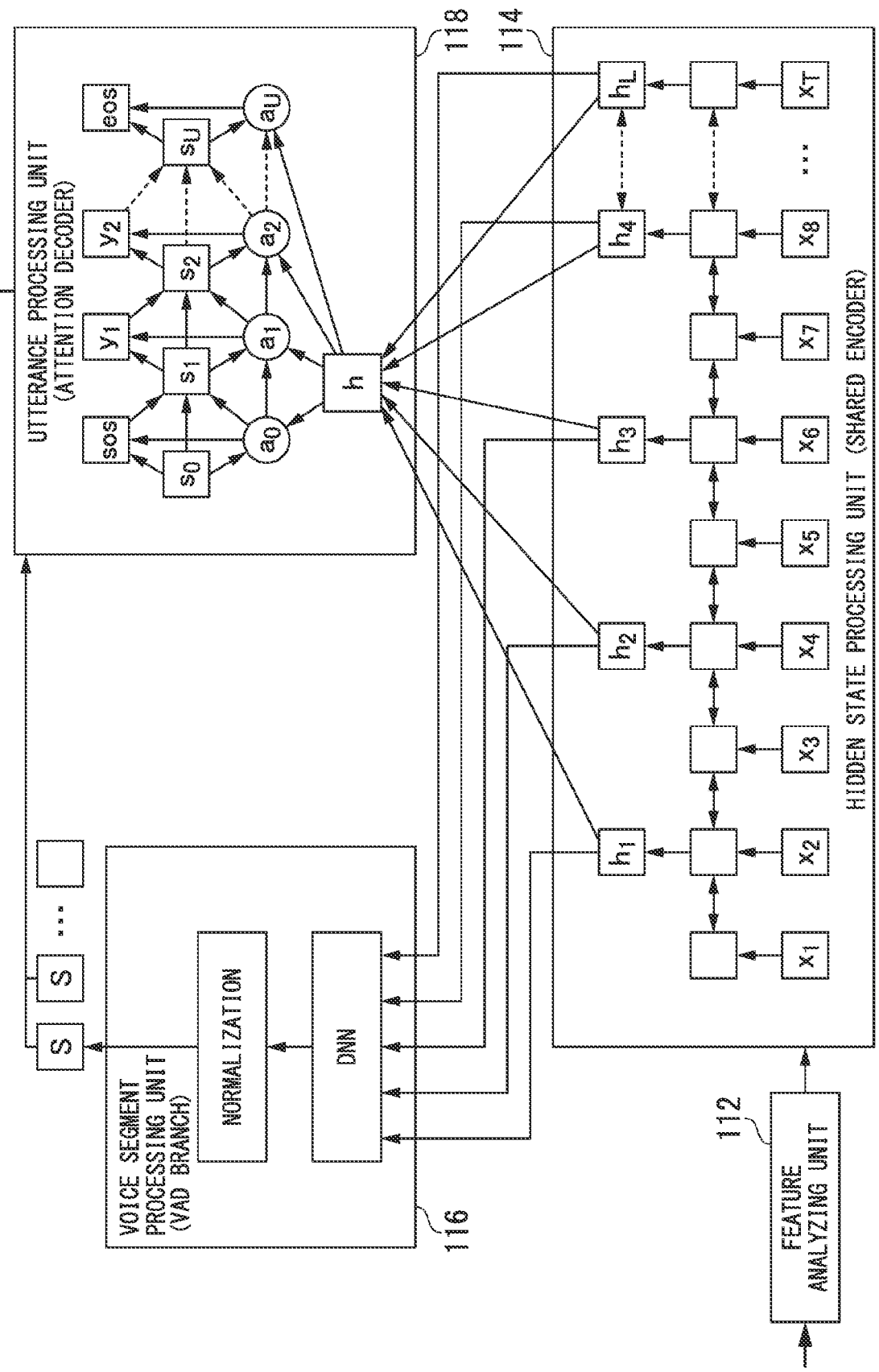
FIG. 3 is an explanatory diagram for exemplifying inference according to the present embodiment.

Next, an operation example of the speech recognition device 10 according to the present embodiment will be described. The modes of operation of the speech recognition device 10 include inference and two-stage model training. First, inference will be discussed. FIG. 3 is an explanatory diagram for exemplifying the inference according to the present embodiment. Model training can be performed prior to inference. In inference, the trained first model, second model, and third model use the hidden state processing unit 114, the voice segment processing unit 116, and the utterance processing unit 118, respectively.

The feature analysis unit 112 acquires an audio signal for each subframe. The feature analysis unit 112 calculates the acoustic feature for the acquired audio signal, and outputs the calculated acoustic feature to the hidden state processing unit 114. The acoustic feature for each subframe is input from the feature analysis unit 112 to the hidden state processing unit 114.

The first model is set in the hidden state processing unit 114, with the first model being configured to function as a shared encoder. The first model is also called an encoder network. Using the first model, the hidden state processing unit 114 calculates a hidden state sequence $[h_1, h_2, \ldots, h_L]$ consisting of the hidden state of each frame from an acoustic feature sequence $[x_1, x_2, \ldots, x_T]$ consisting of the acoustic feature of each subframe.

The first model has a first stage model and a second stage model. The hidden state processing unit 114 downsamples the acoustic feature sequence $[x_1, x_2, \ldots, x_T]$ using the model of the first stage, and calculates the frame feature sequence $[u_1, u_2, \ldots, u_L]$ consisting of the frame feature of each frame. The hidden state processing unit 114 downsamples the frame feature sequence $[u_1, u_2, \ldots, u_L]$ consisting of the frame feature of each frame using the second stage model and calculates the hidden state sequence $[h_1, h_2, \ldots, h_L]$ consisting of the hidden state of each frame.

The hidden state processing unit 114 outputs the hidden state sequence to the voice segment processing unit 116 for each frame. The hidden state processing unit 114 outputs the hidden state sequence for each block composed of a plurality of frames to the utterance processing unit 118.

The second model is set in the voice segment processing unit 116, and the second model is configured to function as a VAD branch. The voice segment processing unit 116 calculates the voice segment probability from the hidden state sequence for each frame using the second model. The second model has, for example, a DNN and a normalization function. The DNN may be of any type such as a convolutional neural network (CNN) and a recurrent neural network (RNN). The voice segment processing unit 116 calculates a scalar real value from the hidden state sequence as the input value by using the second model. The voice segment processing unit 116 normalizes the calculated real value using a normalization function, and calculates the obtained computed value as the voice segment probability. The calculated voice segment probability becomes the output value from the second model.

The voice segment processing unit 116 determines a frame in which the calculated voice segment probability exceeds the probability threshold to be an active frame, and determines a frame in which the voice segment probability is equal to or less than the probability threshold to be an inactive frame. Then, the voice segment processing unit 116 determines segments composed of inactive frames whose frame number is consecutive beyond the consecutive non-voice duration threshold to be non-voice segments, and determines other segments to be voice segments.

For example, the voice segment processing unit 116 may determine a block in which the ratio of frames that are voice segments for each block is equal to or higher than a predetermined block determination threshold to be a speech block in which voice segments are contained, and may determine other blocks to be non-speech blocks not containing voice segments.

The voice segment processing unit 116 outputs voice segment information indicating whether or not a voice segment is included for each block to the utterance processing unit 118. In FIG. 3, "S" and "_" surrounded by a square indicate a speech block and a non-speech block, respectively.

The third model is set in the utterance processing unit 118, with the third model being configured to function as an attention decoder. The third model is also called an attention network.

The utterance processing unit 118 identifies a block belonging to a voice segment based on the voice segment information input from the voice segment processing unit 116. The utterance processing unit 118 accumulates the hidden state sequence for each block input from the hidden state processing unit 114.

The utterance processing unit 118 uses the third model to determine the utterance content on the basis of the hidden state sequence for each block belonging to a voice segment up to the latest block. The utterance processing unit 118 may output utterance information indicating the determined utterance content to another device, a functional unit, or the like.

The third model illustrated in FIG. 3 is a mathematical model based on long short-term memory (LSTM). LSTM is a kind of RNN and includes a plurality of cells. In FIG. 3, $a_0, a_1, a_2, \ldots, a_u$ denote content vectors, respectively. U+1 indicates the number of cells in the input layer forming the third model. The individual content vectors are calculated, for example, as a block-wise weighted sum of hidden states up to the block corresponding to that cell. The content vector $a_u$ is the weighted sum of the hidden states up to the latest block. The weighting coefficient used to calculate the weighted sum is derived from the third parameter set obtained by learning the third model.

$s_0, s_1, s_2, \ldots, s_u$ each indicate a decoder state vector. The decoder state vector of the 1-th cell, which is the cell of interest as the processing target, is calculated from the output gate vector and the cell activation vector of the cell.

Here, 1 is an index indicating an individual cell, and is represented by an integer value of 0 or more and U+1 or less. The output gate vector is calculated from the input vector of the cell and the decoder state vector of the 1-th−1 cell. The input vector is calculated from the embedding vector and the content vector for the label corresponding to the cell. The cell activation vector of the 1-th cell is calculated from the forget gate vector of the 1-th cell, the cell activation vector of the 1-th−1 cell, the input gate vector of the 1-th cell, the input vector of the 1-th cell, and the decoder state vector of the 1-th−1 cell. The forget gate vector of the 1-th cell is calculated from the input vector of the 1-th cell and the decoder state vector of the 1-th−1 cell. The input gate vector of the 1-th cell is calculated from the input vector of the 1-th cell and the decoder state vector of the 1-th−1 cell. The parameters used in these operations form part of the third parameter set.

$y_1$, $y_2$, etc. denote individual labels or the label probabilities of the labels. sos and eos denote labels indicating the start and end of the label sequence or the label probability of the label, respectively. However, the label probability for the start of a label sequence may be set to 1. The label probability is used to calculate the probability for a series of label sequences that are candidates for utterance information. Using the third model, the utterance processing unit 118 can calculate the label probability for each label candidate as a function of the content vector and the decoder state vector as the output value from each cell. Using any method such as the list method or the one-pass method, the utterance processing unit 118 can determine the recognition result having the highest probability from the probabilities of the label sequence candidates. The list method and the one-pass method are each a type of beam search method.

Figure 4:
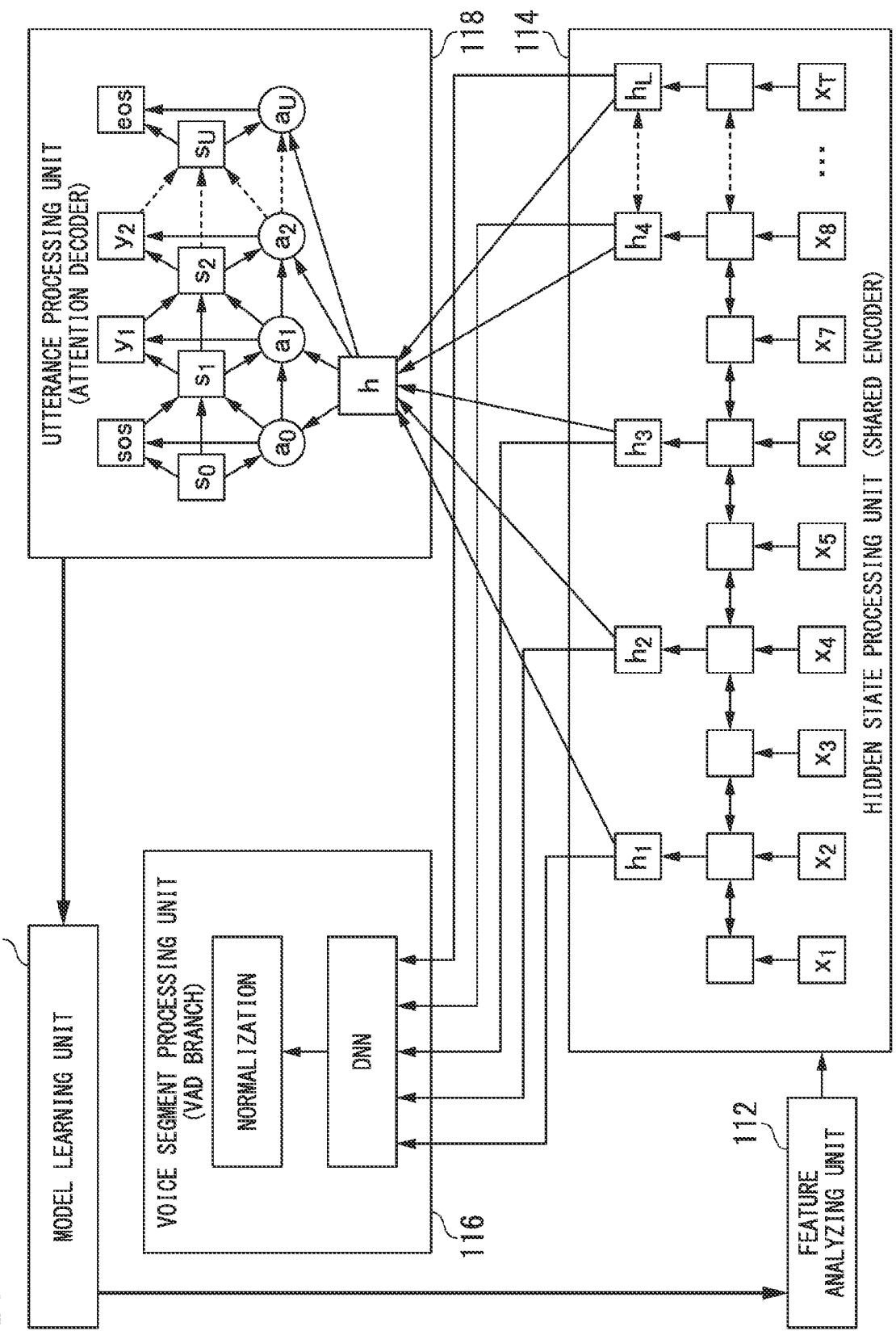
FIG. 4 is an explanatory diagram for exemplifying the model training of the first stage according to the present embodiment.

Next, the model training of the first stage will be explained. In the following explanation, the differences from inference will be the main focus. Those configurations or processes common to inference will be denoted by the same reference numerals, with the explanations being cited. FIG. 4 is an explanatory diagram for exemplifying the model training of the first stage according to the present embodiment. The model training of the first stage may be similar to the attention-based transformer speech recognition process. That is, in the first stage model training, the first model and the third model are training using the training data of the first kind.

Of the individual data sets that form the first type of training data, the model training unit 120 outputs the input data to the feature analysis unit 112. The feature analysis unit 112 outputs an acoustic feature based on the input data to the hidden state processing unit 114. The hidden state processing unit 114 outputs a hidden state sequence based on the acoustic feature to the utterance processing unit 118. The model training unit 120 recurrently updates the parameter set of the first model and parameter set of the third model so that the first difference between the estimated probability for each candidate of the utterance information obtained from the utterance processing unit 118 and the estimated probability shown in the output data is reduced for the training data as a whole. When the first difference converges, the model training unit 120 stops training the first model and the third model at that point. The model training unit 120 sets the first model parameter set and the third model parameter set obtained by the training in the hidden state processing unit 114 and the utterance processing unit 118, respectively.

Figure 5:
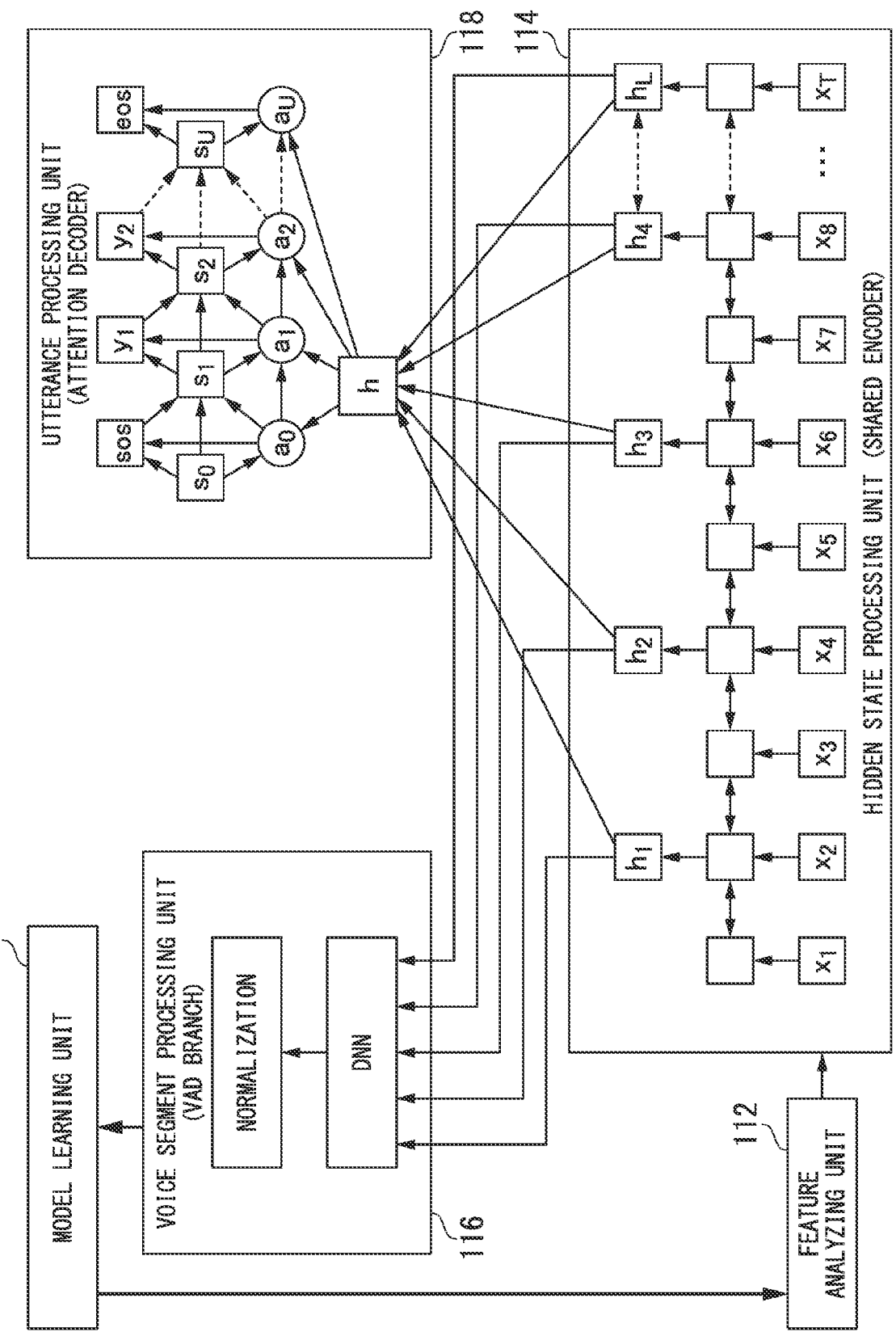
FIG. 5 is an explanatory diagram for exemplifying the model training of the second stage according to the present embodiment.

Next, the model training of the second stage will be explained. FIG. 5 is an explanatory diagram for exemplifying the second stage model training according to the present embodiment. In the second stage model training, the first model and the third model obtained by the first stage model training are set, and the second model is trained using the second kind of training data. That is, in the second stage model training, the first model parameter set and the second model parameter set used for calculating the estimated probabilities are fixed.

Of the individual data sets that form the second type of training data, the model training unit 120 outputs the input data to the feature analysis unit 112. The feature analysis unit 112 outputs an acoustic feature based on the input data to the hidden state processing unit 114. The hidden state processing unit 114 outputs a hidden state sequence based on the acoustic feature to the voice segment processing unit 116. The model training unit 120 recurrently updates the second model parameter set so that the second difference between the between the voice segment probability for each frame obtained from the voice segment processing unit 116 and the voice segment probability in the frame indicated in the output data is reduced. When the second difference converges, the model training unit 120 stops training the second model at that point. The model training unit 120 sets the second model parameter set obtained at that time in the voice segment processing unit 116.

Figure 6:
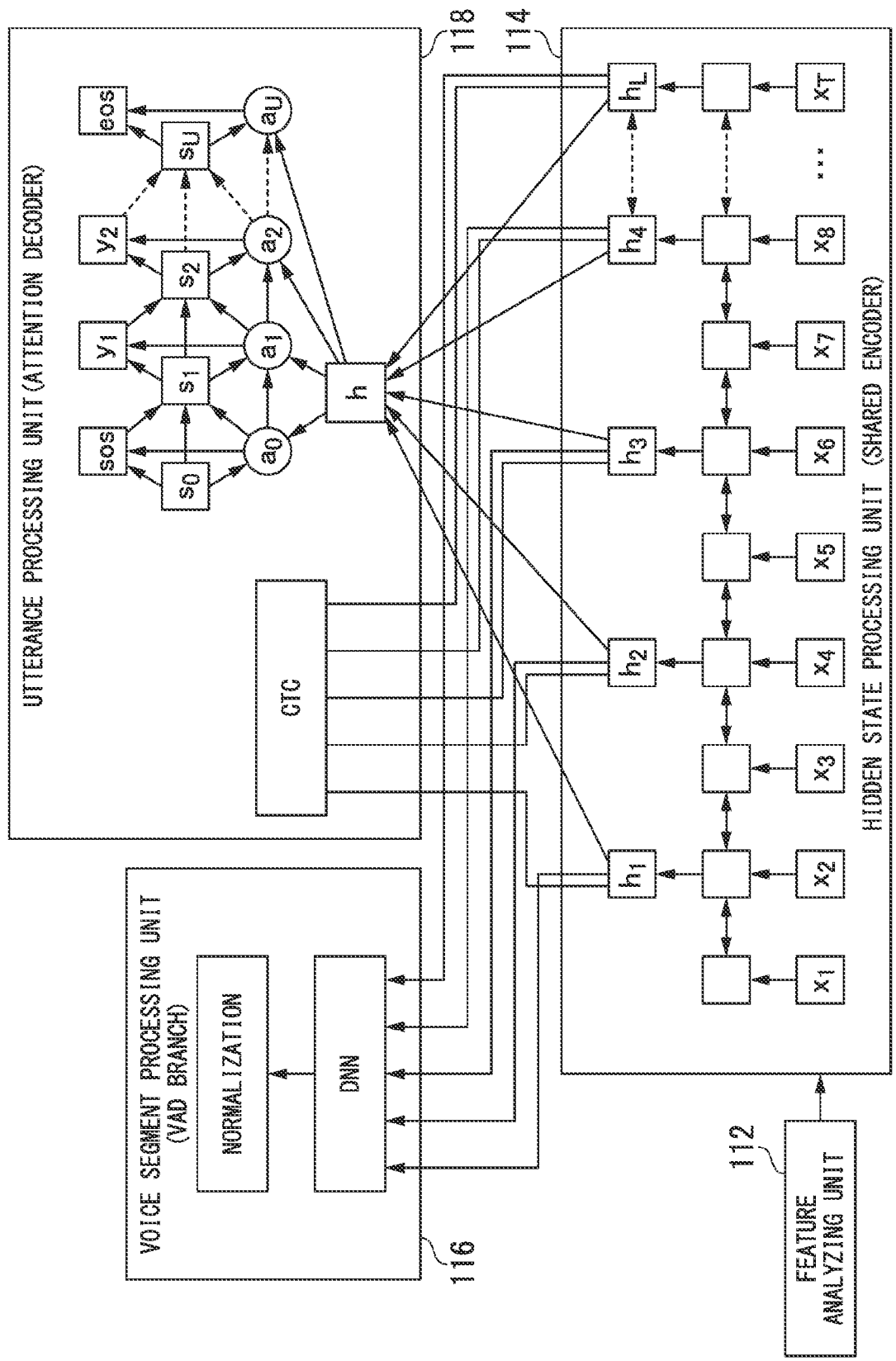
FIG. 6 is an explanatory diagram showing a modified example of the speech recognition device according to the present embodiment.

The third model set in the utterance processing unit 118 may further include a Connectionist Temporal Classification (CTC) branch (see FIG. 6). A CTC branch is also called a CTC network.

The utterance processing unit 118 executes the following processing as a function of the CTC branch. A hidden state sequence is input from the hidden state processing unit 114 to the utterance processing unit 118, which obtains a first probability distribution having, as a first probability, the probability of each candidate of the label sequence up to the latest label obtained by the attention network.

The utterance processing unit 118 obtains a second probability distribution having, as a second probability, the probability of each candidate of the second label sequence including the possibility of including one or a plurality of blank labels as a part of the acquired label sequence candidates. A blank label is a label indicating that the utterance is not specified. For example, when a label sequence obtained by the attention network is "y1y2", according to the CTC branch, the label sequence "_y1_y2_" can be obtained as one of the candidates for the second label sequence. Here, "_" indicates a blank label.

The utterance processing unit 118 may determine a candidate of the label sequence having the highest calculated second probability as the recognition result. The utterance processing unit 118 may also define a segment with more than a predetermined number of blank labels as a non-speech segment. However, the blank label is not an identifier that explicitly indicates the presence or absence of an utterance. For example, a blank label may contain a noise interval in which noise is presented and a short period of silence during an utterance. Such a silent segment constitutes, for example, a segment in which a syllabic nasal appears. Syllabic nasals occur frequently in Japanese utterances. Therefore, a voice segment detected based on a blank label is not always highly reliable. Further, as a threshold used for determining a non-voice segment, it is necessary to set a threshold for the number of consecutive blank label frames.

Note that the utterance processing unit 118 may include a blank label in some of the label sequence candidates corresponding to the second probability and generate new label sequence candidates. The utterance processing unit 118 further calculates transition probabilities of new label sequence candidates using the transition probability between preset blank labels, and the transition probability between blank labels and other labels. Among the new label sequence candidates, those that include the original label sequence candidates in their label order may be selected, and the sum among the selected label sequence candidates, that is, the convolution sum based on the transition probability, may be calculated as a third probability. The utterance processing unit 118 may calculate the linear sum of the third probability and the first probability for each candidate of the original label sequence as a score, and define the label sequence candidate that gives the highest score as the recognition result.

As the first model and the third model described above, the encoder network and attention-based network described in Patent Document 1 or Non-Patent Document 1 can be used. As the CTC branch, the CTC module described in Patent Document 1 or the CTC model described in Non-Patent Document 1 can be used.

Figure 7:
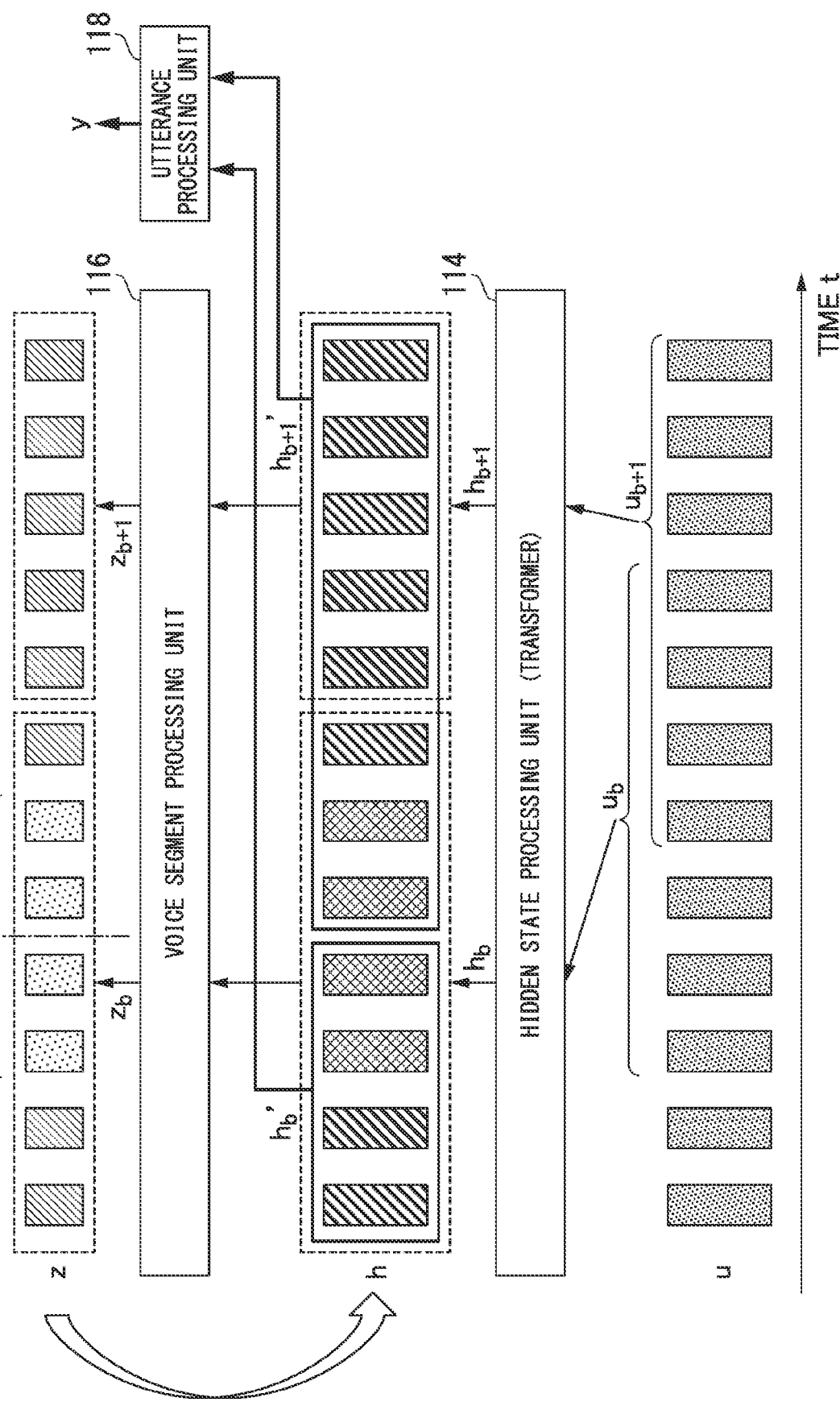
FIG. 7 is an explanatory diagram showing a second function configuration example of the speech recognition device according to the present embodiment.

Next, the difference between the second functional configuration example of the speech recognition device 10 according to the present embodiment and the above functional configuration example will be mainly described. Unless otherwise specified, the above description is used for common points with the above functional configuration example. FIG. 7 is an explanatory diagram showing the second functional configuration example of the speech recognition device 10 according to the present embodiment.

The voice segment processing unit 116 determines for each frame whether or not the frame is a voice segment frame belonging to a voice segment as described above. When the block length of one block exceeds V+3 frames, the block may include a plurality of voice segments with non-voice segments in between. In FIG. 7, each filled-in vertical rectangle represents one frame. With the left end as a reference, the segment from the third frame to the ninth frame corresponds to block b, while the segment from the seventh frame to the twelfth frame corresponds to block b+1. It is assumed that the voice segment processing unit 116 determines the first, second, and seventh to twelfth frames as being active frames, and the third to sixth frames as being inactive frames.

Under this assumption, the voice segment processing unit 116 determines the first, second, and seventh to twelfth frames to be voice segments, and the third to sixth frames to be non-voice segments. The non-voice segment consisting of the third to sixth frames is sandwiched between the first voice segment consisting of the first and second frames and the second voice segment consisting of the seventh to twelfth frames. In the voice segment processing unit 116, the frames related to block b are the first to seventh frames due to a processing delay. Therefore, block b has two voice segments and one non-voice segment sandwiched between the voice segments.

Assume, as an example, that the voice segment processing unit 116 determines whether or not a block is a voice segment depending on whether the block contains at least one voice segment frame. In this case, a series of segments including block b and the blocks before and after block b are all determined to be voice segment blocks. Therefore, these series of segments are processed by the utterance processing unit 118 as belonging to one common voice segment. In reality, when the end of one voice segment and the beginning of the next voice segment are included in block b, erroneous recognition may occur.

Further, assume the case that, on the basis of whether or not the ratio of the voice segment frames in one block exceeds a predetermined ratio (for example, 0.5), the voice segment processing unit 116 determines whether or not the block is a voice segment. In this case, the block b is determined to be a non-voice segment block. The utterance processing unit 118 treats the block b−1 immediately prior and the block b+1 immediately after block b as part of one voice segment and the next voice segment, respectively. However, in the case of the end of one voice segment and the beginning of the next voice segment being contained in the block b, which was determined to be a non-voice segment, these would be missing from the determination of the utterance content. This point is also a cause of erroneous recognition.

Therefore, the voice segment processing unit 116 determines whether or not each block contains a voice segment composed of a plurality of voice segment frames. The voice segment processing unit 116 adjusts the block division by dividing a block containing a plurality of voice segments into blocks each containing a voice segment. In the present disclosure, adjusting the block division is sometimes referred to as re-blocking. The voice segment processing section 116 outputs to the utterance processing unit 118 voice segment information indicating that each block before adjustment is a voice segment after adjustment.

The utterance processing unit 118 is notified of the segments forming blocks post adjustment by the voice segment information from the voice segment processing unit 116. The voice segment processing unit 116 can process the individual blocks following adjustment as separate blocks.

The voice segment processing unit 116 may output the voice segment information to the hidden state processing unit 114. The hidden state processing unit 114 refers to the voice segment information input from the voice segment processing unit 116 to specify a frame belonging to a block including a voice segment. The hidden state processing unit 114 configures a hidden state sequence for each block including a voice segment from the hidden state corresponding to the specified frame, and outputs the configured hidden state sequence to the utterance processing unit 118. In that case, the utterance processing unit 118 does not necessarily need to perform output to the utterance processing unit 118.

In the example of FIG. 7, the voice segment processing unit 116 divides the block b into a preceding block b' consisting of frames preceding the center of the non-voice segment and a succeeding block b+1' consisting of subsequent frames. The voice segment processing unit 116 may concatenate the frames of the voice segment that follow the center of the non-voice segment to the block b immediately following, to thereby configure a new succeeding block b+1'. The hidden state processing unit 114 can concatenate the hidden states $[h_{bC+1}, \ldots, h_{bE}]$ corresponding respectively to the frames $b_{C+1}$ to $b_E$ of the voice segment following the center of the non-voice segment, to the hidden state sequence $h_{b+1}$ for the succeeding block b+1, and configure the hidden state sequence $h_{b+1}'$ for the adjusted subsequent block b+1'. Here, $b_{C+1}$ and $b_E$ denote the frame immediately after the center of the non-voice segment and the frame at the end of the block b, respectively.

The voice segment processing unit 116 may concatenate frames preceding the center of the non-voice segment to the block b−1 of the immediately preceding voice segment and configure it as the preceding block b−1'. Since the preceding block and the following block are treated by the utterance processing unit 118 as the end of one voice segment and the beginning of the next voice segment, respectively, the utterance information for each voice segment can be estimated without missing the beginning or the end.

As illustrated in FIG. 7, in a block containing a plurality of voice segments, a non-voice segment is sandwiched between voice segments adjacent to each other. Therefore, the voice segment processing unit 116 may determine a post-division block that is followed by a non-voice segment to be the end of a voice segment, and determine a post-division block preceded by a non-voice segment to be the beginning of a voice segment. Moreover, regardless of whether or not division is performed, the voice segment processing unit 116 may determine a block followed by a non-voice segment to be the end of a voice segment and a block preceded by a non-voice segment to be the beginning of a voice segment. The voice segment processing unit 116 may include information indicating whether each block is the end or the beginning of a voice segment in the voice segment information and output that information to the utterance processing unit 118.

The utterance processing unit 118 can determine whether an individual block is at the end, the beginning, or midway in a voice segment based on the voice segment information input from the voice segment processing unit 116. The utterance processing unit 118 can define the range to search for the utterance information at one time based on this determination without relying on a determination of the end of the utterance based on a statistical computation using a model.

(Experimental Example)

Next, an example of an experiment carried out on the speech recognition device 10 according to the present disclosure will be described. In the experiment, the performance of VAD according to the present disclosure, the impact on speech recognition processing, and the calculation time were evaluated.

The feature analysis unit 112 calculates an 80-dimensional mel-scale as an acoustic feature with a window size of 512 samples and a hop length of 128 samples, from an audio signal serving as input data. The first model has a two layers of convolution layers, consisting of two convolutional layers with stride 2 and 3, a 512-dim linear projection layer, and a positional encoding layer, followed by 12 transformer layers with 2048 linear units and layer normalization.

The decoder has $N_d$ layers (for example, 6 layers) with 2048 units. The attention dimension size is set as 256 with 4-multihead attentions. The block length $L_{block}$ and hop length $L_{hop}$ are 40 and 16, respectively. A linear layer is applied to the VAD branch of the second model. The number of parameters of the pre-trained speech recognition model was 30.3 M.

In the first stage of model training, multi-task learning was performed using CTC loss as a loss function with a weighting coefficient of 0.3. A linear layer was added to the end of the first model to project hidden states onto the token probability for CTC. The transformer that forms the first model was trained using the Adam optimizer. 40 epochs were trained at a training rate of 0.005 with warmup steps of 25,000 on the Corpus of Spontaneous Japanese (CSJ). Also, 80 epochs were trained at a training rate of 0.005 with warmup steps of 25,000 for the Technology Entertainment Design-Laboratoire d'Informatique de l'Université du Maine corpus release 2 (TED-LIUMv2).

In the second stage of model training, the VAD branch was trained using the Adam optimizer as the second model, and 30 epochs were trained at a training rate of 0.00001 with warmup steps of 10,000 for all datasets.

The first task involved comparing the VAD of the present embodiment with an extra VAD model (hereinbelow extra VAD), and a CTC-based VAD (hereinbelow CTC-based). The extra VAD is a method for realizing VAD by using a separate mathematical model for acoustic features. For the evaluation, the Augmented Multi-party Interaction (AMI) corpus, CSJ corpus, and TED-LIUM corpus were each used. These corpus contain long recordings of more than 20 minutes.

The detection error rate (ER) is used as an index of the VAD system, where ER is the sum of two different error types: false alarm and missed detection. The false alarm period corresponds to a period that was erroneously identified as a voice segment even though no utterance was made. The missed detection period corresponds to a period in which segments that originally were a voice segment and a non-voice segment were detected as a non-voice segment and a voice segment, respectively. As shown in Equation (5), the detection error rate ER corresponds to the ratio of the sum of the missed detection period M(t) and the false alarm period F(t) to the total number of voice segments N(t). In Equation (5), t and T respectively denote the frame and frame number.

[Equation 5]

$$ER = \frac{\sum_{t=1}^{T} M(t) + \sum_{t=1}^{T} F(t)}{\sum_{t=1}^{T} N(t)} \quad (5)$$

FIG. 8 shows the number of parameters and detection error rate ER obtained using each of AMI, CSJ and TED-LIUMv2 for each of extra VAD, CTC-based and the present embodiment. When the extra VAD uses the AMI and CSJ corpuses, the detection error rate ER is the lowest as compared with other methods, but the number of parameters is the largest at 4.45 M, indicating that the amount of computation is large. CTC-based does not require parameters that require training separately from speech recognition, but has a higher detection error rate ER compared to the other methods. The present embodiment includes an FC layer as the second model and requires training of the parameters, but the number of parameters is extremely small, being 1/5000 or less of the number of parameters in extra VAD. The detection error rate ER according to the present embodiment is substantially the same as the detection error rate ER according to the extra VAD. In particular, when the TED-LIUMv2 corpus is used, the detection error rate ER is the lowest. The result of FIG. 8 shows that according to the present embodiment, voice segments can be detected accurately without significantly increasing the amount of computation.

In the second task, the character error rate (CER)/word error rate (WER) was found as an evaluation index of the speech recognition result obtained using the E2E-ASR toolkit (E2E model), which is an existing speech recognition engine, using the CSJ and TED-LIUMv2 corpuses for each of Oracle (target value), comparative example (baseline), CTC-based and the present embodiment. CER/WER is the ratio of the character error rate to the word error rate.

The target value refers to an index value obtained by inputting a known voice segment divided according to the time series information of the corpus used as a data set into the E2E model.

The "comparative examples" refer to an index value obtained by inputting to the E2E model an audio signal in a voice segment divided when the length of the hidden state sequence exceeds the threshold $L_{th}$. Here, the threshold $L_{th}$ is set to three stages of 0, 300, and 500.

"CTC-based" refers to an index value obtained by inputting to the E2E model an audio signal in the voice segment determined by the CTC-based VAD.

"Present embodiment" refers to an index value obtained by inputting to the E2E model an audio signal in the voice segment determined by the VAD according to the present embodiment. Re-blocking is applied in the division of voice segments. When one utterance was long, a hidden state sequence having a length exceeding 300 frames as the threshold $L_{th}$ was divided. The beam width was set to 20 in the beam search in speech recognition. CER and WER can be calculated by collating the recognition result with the text forming each corpus.

FIG. 9 shows index values obtained by using the CSJ corpus for each of the target value, the comparative examples, CTC-based, and the present embodiment. In FIG. 9, eval1, eval2, and eval3 refer to different parts of the CSJ corpus. The proportions of the voice segments of eval1, eval2, and eval3 are 80%, 81%, and 77%, respectively. However, for CTC-based, the average value for each of eval1, eval2, and eval3 is shown.

According to FIG. 9, for each of eval1, eval2, and eval3, the index value CER/WER of the present embodiment is small and approximates the index value CER/WER most related to the target value. The result of FIG. 9 shows that the voice segments determined by the present embodiment can suppress a decrease in the speech recognition rate due to erroneous determination of voice segments.

FIG. 10 shows index values obtained by using eval1, eval2, and eval3 for each of the comparative example ($L_{th}$=300) and the present embodiment with and without re-blocking. For all of eval1, eval2, and eval3, the index value CER/WER became the smallest for re-blocking in the present embodiment. This indicates that a decrease in the speech recognition rate can be suppressed by preventing the loss of voice segments by re-blocking.

Regarding the presence of re-blocking in the present embodiment, the index value CER/WER and the real time factor (RTF) were obtained for three different consecutive non-voice duration thresholds, V, of 5, 10 and 16. RTF corresponds to the ratio of the computation time to the length of the voice segment to be processed.

FIG. 11 shows the index values obtained by using eval1, eval2, and eval3 and RTF for each of the comparative example ($L_{th}$=300) and re-blocking in the present embodiment. With respect to re-blocking in the present embodiment, the index values and RTFs were obtained for each of the three consecutive non-voice duration thresholds, V, of 5, 10 and 16. According to FIG. 11, re-blocking of the present embodiment was performed for all of eval1, eval2, and eval3, with the index value CER/WER being the smallest for V=10. The RTF for re-blocking in the present embodiment was smaller than that of the comparative example for all of V=5, 10 and 16. This is presumed to be due in part to the fact that in the comparative example, processing is always performed for segments determined to be non-voice segments, and so the amount of hidden state sequences to be processed is maintained even for short utterances. With respect to re-blocking of the present embodiment, the RTF was the smallest for V=5 out of the three options. However, the RTF related to V=10 does not give rise to a significant difference from the RTF related to V=5. This indicates that even when V=10, a decrease in the speech recognition rate can be effectively suppressed while ensuring real-time performance.

As described above, the speech recognition system according to the present embodiment is constituted so as to analyze an acoustic feature for each subframe of an audio signal, determine a hidden state for each frame consisting of multiple subframes on the basis of the acoustic feature using a first model, determine a voice segment for each frame on the basis of the hidden state using a second model, and determine an utterance content on the basis of a sequence of the hidden states of each block consisting of multiple frames belonging to a voice segment using a third model.

With this configuration, the hidden state used in the third model for determining the utterance content is obtained by the first model, and the voice segment can be explicitly determined on the basis of the obtained hidden state. Therefore, it is possible to suppress an increase in the amount of computation and the number of parameters of the system as a whole, and to determine voice segments more accurately. Precisely defined voice segments ensure real-time performance while minimizing a decrease in the speech recognition rate.

The speech recognition system may be further configured to divide a block having two or more voice segments consisting of voice segment frames that are frames belonging to a voice segment into blocks that individually contain voice segments.

With this configuration, it is possible to prevent the loss of block containing voice segments in order to determine the utterance content. Therefore, it is possible to avoid a decrease in the speech recognition rate due to missing voice segments.

Further, the speech recognition system may be configured to calculate for each frame a probability that the frame belongs to a voice segment on the basis of the hidden state as a voice segment probability, determine among inactive frames, which are frames whose voice segment probability is equal to or less than a predetermined probability threshold, segments in which inactive frames are consecutive beyond a predetermined threshold frame number to be non-voice segments, determine other segments to be voice segments, and determine frames whose voice segment probability is greater than the probability threshold and segments in which the inactive frames are not consecutive beyond the threshold frame number to be voice segments.

With this configuration, a period in which periods with a low voice segment probability are consecutive for a certain period or more is determined to be a non-voice segment, and a period other than that is determined to be a voice segment. Even if a period of temporary or intermittent silence arises, it is not immediately determined to be a non-voice segment, leaving the possibility that the content of the utterance will be determined. Therefore, it is possible to avoid a decrease in the speech recognition rate due to erroneous determination of a short-term silence period as a non-voice segment.

Further, the speech recognition system may be constituted such that the first model has a first-stage model and a second-stage model, the first model being used to convert an acoustic feature for each subframe to a frame feature for each frame, and the second-stage model being used to estimate the hidden state on the basis of the frame feature.

With this configuration, the acoustic feature obtained per subframe is converted to the frame feature obtained per frame, which is a longer unit than the subframe, and the hidden state is obtained from the frame feature. Therefore, it is possible to reduce the amount of computation by downsampling of acoustic features while suppressing a decrease in the speech recognition rate or the erroneous determination rate of voice segments.

In addition, the speech recognition system may be constituted to calculate an estimated probability for each candidate of the utterance content corresponding to a sequence of the hidden states up to the latest block forming a voice segment, and determine the utterance content with the highest estimated probability.

With this configuration, the most probable utterance content is determined as the utterance content related to the latest voice segment at that time. Therefore, it is possible to suppress a decrease in the speech recognition rate while ensuring real-time performance.

Although one embodiment of the present invention has been described in detail with reference to the drawings, it should be understood that this is exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

DESCRIPTION OF THE REFERENCE SYMBOLS

10: Speech recognition device
20: Microphone
110: Control unit
112: Feature analysis unit
114: Hidden state processing unit
116: Voice segment processing unit
118: Utterance processing unit
120: Model training unit
152: Processor
156: Drive unit
158: Input unit
160: Output unit
162: ROM
164: RAM
166: Auxiliary storage unit
168: Interface unit

What is claimed is:

1. A speech recognition system comprising:
a processor and a memory, the processor coupled to the memory,
the processor is configured to:
input an audio signal;
calculate an acoustic feature for each subframe of the audio signal;
calculate, by using a first model, a hidden state series for each frame consisting of multiple subframes on the basis of the acoustic feature;
specify, by using a second model, whether a voice segment or a non-voice segment for each block on the basis of the hidden state series, the block consisting of a plurality of frames;
calculate, by using a third model, a probability for an utterance content candidate on the basis of a sequence of the hidden state provided series for each block having a single voice segment to specify an utterance content; and
train the third model to calculate the probability for the utterance content candidate on the basis of hidden state series; wherein
the processor is configured to:
specify a first frame subsequent to the non-voice segment as a beginning of the voice segment,
specify a second frame prior to a succeeding non-voice segment as an end of the voice segment,
adjust block arrangement of the audio signal, by concatenating one or more frames up to the end of the voice segment in a first block with the end of the voice segment to a second block proceeding to the first block, concatenating one or more frames from the beginning of the voice segment in a third block with the beginning of the voice segment to a fourth block subsequent to the third block,
search for recognition results indicating an utterance content for each block arrangement of the audio signal based on the probability for the utterance content candidate calculated by using the third model, and
output the recognition results to an external device.

2. The speech recognition system according to claim 1, wherein
the processor is configure to divide, by using the second model, block comprising two or more voice segments into two or more blocks, the two or more blocks containing respective voice segments.

3. The speech recognition system according to claim 2, wherein the processor is configured to
calculate for each frame a probability that the frame belongs to a voice segment on the basis of the hidden state, the probability being as a voice segment probability;
specify, a segment having consecutive inactive frames in which the number of inactive frames is more than a predetermined threshold frame number as the non-voice segment, each of the inactive frames having voice segment probability equals to or less than a predetermined probability threshold; and
specify a segment having the consecutive inactive frames as voice segments.

4. The speech recognition system according to claim 1, wherein
the first model comprises a first-stage model and a second-stage model,
the first-stage model being designed for converting an acoustic feature for each subframe to a frame feature for each frame, and
the second-stage model being designed for specifying the hidden state series on the basis of the frame feature.

5. The speech recognition system according to claim 1, wherein
the third model is designed for calculating an estimated probability for each candidate of the utterance content corresponding to a hidden state series up to the latest block forming a voice segment, and specifying the utterance content with the highest estimated probability.

6. A non-transitory computer-readable medium storing instructions at a speech recognition system, the instructions executed by a processor cause the speech recognition system to:
input an audio signal;
calculate an acoustic feature for each subframe of the audio signal;
calculate, by using a first model, a hidden state series for each frame consisting of multiple subframes on the basis of the acoustic feature;

specify, by using a second model, whether a voice segment or a non-voice segment for each block on the basis of the hidden state series, the block consisting of a plurality of frames;

calculate, by using a third model, a probability for an utterance content candidate on the basis of a sequence of the hidden state series provided for each block having a single voice segment to specify an utterance content; and train the third model to calculate the probability for the utterance content candidate on the basis of hidden state series; wherein the instructions cause the speech recognition system to:

specify a first frame subsequent to the non-voice segment as a beginning of the voice segment, specify a second frame prior to a succeeding non-voice segment as an end of the voice segment, adjust block arrangement of the audio signal, by concatenating one or more frames up to the end of the voice segment in a first block with the end of the voice segment to a second block preceding to the first block, concatenating one or more frames from the beginning of the voice segment in a third block with the beginning of the voice segment to a fourth block subsequent to the third block, search for recognition results indicating an utterance content for each block arrangement of the audio signal based on the probability for the utterance content candidate calculated by using the third model, and output the recognition results to an external device.

7. A method for speech recognition, comprising the steps of:

inputting an audio signal;

calculating an acoustic feature for each subframe of the audio signal;

calculating, by using a first model, a hidden state series for each frame consisting of multiple subframes on the basis of the acoustic feature;

specifying, by using a second model, whether a voice segment or a non-voice segment for each block on the basis of the hidden state series, the block consisting of a plurality of frames;

calculating, by using a third model, a probability for an utterance content candidate on the basis of a sequence of the hidden state series provided for each block having a single voice segment to specify an utterance content; and training the third model to calculate the probability for the utterance content candidate on the basis of hidden state series; further comprising the steps of:

specifying a first frame subsequent to the non-voice segment as a beginning of the voice segment, specifying a second frame prior to a succeeding non-voice segment as an end if the voice segment, adjusting block arrangement of the audio signal, by concatenating one or more frames up to the end of the voice segment in a first block with the end of the voice segment to a second block preceding to the first block, concatenating one or more frames from the beginning of the voice segment in a third block with the beginning of the voice segment to a fourth block subsequent to the third block, searching for recognition results indicating an utterance content for each of arranged blocks of the audio signal based on the probability calculated by using the third model, and outputting the recognition results to an external device.

\* \* \* \* \*